US010718877B2

(12) United States Patent
Williams (10) Patent No.: US 10,718,877 B2
(45) Date of Patent: Jul. 21, 2020

(54) SEISMIC DATA ANALYSIS INCLUDING MODELLING SLIPPAGE PLANES (71) Applicant: WESTERNGECO LLC, Houston, TX (US)

(72) Inventor: Michael John Williams, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 197 days.

(21) Appl. No.: 15/030,953

(22) PCT Filed: Oct. 21, 2014

(86) PCT No.: PCT/US2014/061500
§ 371 (c)(1),
(2) Date: Apr. 21, 2016

(87) PCT Pub. No.: WO2015/061266
PCT Pub. Date: Apr. 30, 2015

(65) Prior Publication Data
US 2016/0245939 A1 Aug. 25, 2016

Related U.S. Application Data (60) Provisional application No. 61/893,534, filed on Oct. 21, 2013.

(51) Int. Cl.
G01V 1/28 (2006.01)
G01V 1/40 (2006.01)

(52) U.S. Cl.
CPC ............. *G01V 1/288* (2013.01); *G01V 1/282* (2013.01); *G01V 1/40* (2013.01); *G01V 2210/123* (2013.01); *G01V 2210/1234* (2013.01)

(58) Field of Classification Search
CPC ........... G01V 1/288; G01V 1/282; G01V 1/40
(Continued)

(56) References Cited

U.S. PATENT DOCUMENTS 5,996,726 A 12/1999 Sorrells et al.
6,462,549 B1 10/2002 Curtis et al.
(Continued)

FOREIGN PATENT DOCUMENTS

WO WO2006030310 A2 3/2006
WO WO2007092596 A2 8/2007
WO WO2013067363 A1 5/2013

OTHER PUBLICATIONS

"Slip tendency analysis, fault reactivation potential and induced seismicity in a deep geothermal reservoir"; Journal of Structural Geology 31(10):1174-1182; Oct. 2009.*
(Continued)

*Primary Examiner* — Matthew E. Gordon (57) ABSTRACT

A method of analyzing measured microseismic events obtained from monitoring induced hydraulic fracturing of underground geological formations, the method involving (a) postulate a geomechanical model for the region bounding the microseismic events, the model including the parameters vertical stress, reservoir pore pressure, minimum horizontal stress and the orthogonal horizontal stress, (b) select a microseismic event and (c) for the selected microseismic event assume an associated slippage plane with a postulated orientation, (d) apply the geomechanical model to the postulated orientation to determine the resulting shear stress and normal stress applied to the postulated orientation, (e) repeat steps (c) and (d) to produce a number of postulated slippage planes each with their own shear stress and normal stress attributable to them, (f) select the fracture plane having the highest ratio of shear stress to normal stress as being the fracture plane most likely to be representative of a real
(Continued)

slippage plane consistent with the geomechanical model, (g) repeat steps (b) to (f) to analyze a number of microseismic events to generate a slippage plane most likely to be representative of a real slippage plane for each microseismic event is provided.

19 Claims, 3 Drawing Sheets

(58) Field of Classification Search
USPC .......................................................... 702/6
See application file for complete search history.

(56) References Cited

U.S. PATENT DOCUMENTS

| | | |
|---|---|---|
| 8,831,886 B2 | 9/2014 | Williams |
| 2008/0004847 A1 | 1/2008 | Bradford |
| 2011/0120706 A1* | 5/2011 | Craig ............... E21B 43/26 166/270 |

OTHER PUBLICATIONS

Cipolla, C. et al., "Integrating Microseismic Mapping and Complex Fracture Modeling to Characterize Fracture Complexity", SPE 140185, presented at the SPE Hydraulic Fracturing Technology Conference, The Woodlands, Texas, USA, 2011, 22 pages.
Schorlemmer, D. et al., "Variations in earthquake-size distributions across different stress regimes", Nature, 2005, 437, pp. 539-542.
Weng, X. et al., Modeling of Hydraulic Fracture Network Propagation in a Naturally Fractured Formation, SPE 140253, presented at the SPE Hydraulic Fracturing Technology Conference, The Woodlands, Texas, USA, 2011, 18 pages.
Mock, I. et al., "Slip tendency analysis, fault reactivation potential and induced seismicity in a deep geothermal reservoir", Journal of Structural Geology, 2009, 31(10), pp. 1174-1182.
Exam of European Patent Application No. 14855455.3 dated Jun. 19, 2017, 7 pages.
Search of European Patent Application No. 14855455.3 dated May 30, 2017, 3 pages.
Search Report and Written Opinion of International Patent Application No. PCT/US2014/061500, dated Jan. 26, 2015.

* cited by examiner

SEISMIC DATA ANALYSIS INCLUDING MODELLING SLIPPAGE PLANES

BACKGROUND

The present disclosure relates to a method of analyzing microseismic data obtained from monitoring induced hydraulic fracturing of underground oilfield geological formations.

Hydraulic fracture monitoring ("HFM") is employed in underground oil and gas wellbores to provide an understanding of the geometry of placed hydraulic fracturing to enable better completion design, reliable production predictions and real-time operational decisions during the treatment itself.

Hydraulic fracturing involves the injection of a fluid into the surrounding geological formation with the intention of initiating fracture(s). During such fracturing, elastic waves are produced as the material in the path of fracture propagation fails. Such seismic events are captured and are referred to as microseismic events due to the low magnitude of sound typically emitted.

For each microseismic event seismic traces are recorded, which include both the longitudinal and transverse waves travelling through the formation. These traces are recorded at a number of locations, typically using one or more lines of receivers that may be disposed in one or more monitoring wells or at surface. From these traces it is possible to locate the origin of the microseismic event in space and time.

However the measured data can include a large degree of scatter and uncertainty as to the precise spatial location of the microseismic event. Additionally, microseismic data can be measured that is clearly unrelated to the immediate propagation of a fracture, and relates to other geological or mechanical processes, which may or may not be associated with the fracture propagation.

One common source of such microseismic data is plane slippage, typically occurring ahead of the fracture, along a preexisting fracture plane in the formation. The additional stresses caused by hydraulic fracturing can trigger such a fracture plane to slip even ahead of the propagation of a fracture, providing an additional source of microseismic data.

Fortunately, the seismic trace forming the microseismic event contains within it information which can be used to infer the orientation of such a failure plane. In general for a stress-drop event there are 6 degrees of freedom and the microseismic event mechanism is described by a moment tensor, which dictates the far-field radiation pattern of longitudinal and transverse waves recorded in HFM. Consequently, a comparison between the amplitudes of the primary (i.e. longitudinal) and secondary (i.e. transverse) elastic waves can be used to infer the orientation of the failure plane.

However if this is done with real world data from an oil and gas wellbore, error and scatter in the data can be so great as to result in the data being interpreted in a manner which is inconsistent with realistic geomechanical bounds. Clearly therefore, this simplistic approach is not suitable for real world environments where noise and scatter are significant issues.

An alternative method of interpretation of this data has been proposed which involves making assumptions regarding preferred plane slippage angles based on external information. In such a method, the plane slippage angle is estimated from an external source and is not derived from the HFM procedure.

Thus, improvements in the area of analyzing microseismic hydraulic fracture plane slippage events from a real HFM procedure would be highly desirable.

SUMMARY

Embodiments of the present disclosure provide a method of interpreting the microseismic data originating from a postulated plane slippage e.g. ahead of a developing fracture. The method involves providing a plane slippage angle that is consistent with realistic geomechanics, does not require external input and provides an internally consistent interpretation. The plane slippage angle can be used to characterize the HFM procedure.

Thus, embodiments of the present disclosure relate to a method of analyzing measured microseismic events obtained from monitoring induced hydraulic fracturing of underground geological formations. In the method, a geomechanical model for the region bounding the microseismic events is determined/postulated. The model includes parameters for vertical stress, reservoir pore pressure, minimum horizontal stress and the orthogonal horizontal stress. In the method, a microseismic event is selected and a slippage plane with a postulated orientation is associated with the microseismic event. The geomechanical model is applied to the postulated orientation associated with the microseismic event to determine the resulting shear stress and normal stress applied to the postulated orientation. Further associated slippage planes with postulated orientations are determined for the selected microseismic event and the geomechanical model is used to postulate orientation resulting shear stress and normal stress applied to the further postulated orientations to produce a number/plurality of postulated slippage planes each with their own shear stress and normal stress attributable to them for the selected microseismic event. The fracture plane having the highest ratio of shear stress to normal stress is selected as being the fracture plane most likely to be representative of a real slippage plane consistent with the geomechanical model. The steps for analyzing the selected microseismic event described above are then applied to additional microseismic events to determine a slippage plane most likely to be representative of a real slippage plane for each microseismic event.

Thus, the present invention employs a geomechanical model and finds the slippage planes which are most likely to fail consistent with the geomechanical model and selects these as most likely representative of a real slippage plane. It is assumed that the slippage planes which have the highest shear stress to normal stress are the most likely to fail. The method thus interprets the data in a manner consistent with a realistic geomechanical model to interpret probable orientation of slippage planes.

Once the set of most likely slippage planes has been established, in one embodiment, it is possible to assess how well the postulated slippage planes fit with other aspects of the measured microseismic data, to assess for internal consistency.

As discussed above, the microseismic data contains within it the amplitudes for the primary and both secondary elastic waves for each microseismic event. These elastic waves can be used together to infer the orientation of the slippage plane attributable to the microseismic event. In embodiments of the present disclosure, rather than use the measured microseismic/amplitude data to determine the probable orientation of the slippage plane, it is employed to determine how significant the orientations derived from the method described above are, i.e., how significant are the slippage planes determined from analyzing the microseismic events using the geomechanical model.

Thus in one embodiment, the method involves the step of comparing the slippage planes most likely to be representative of a real slippage plane for each microseismic event, as determined by the method above, with the slippage planes that would fit with the amplitudes of the primary and two secondary elastic waves. This establishes a fit between the angle of the slippage planes generated from the geomechanical model with the angles that are consistent with the amplitude ratios from the measured microseismic data. In some embodiments, other comparisons such as the polarity of the primary and two secondary waves may be used in combination with, or as an alternative to, amplitudes in this step.

However, the data is noisy and fits to the data may sometimes occur purely by chance. Thus, in order to guard against the possibility that a geomechanical model by chance produces a good fit with the data, the fit with the data is preferably compared to a statistical baseline. In one aspect, a statistical baseline analysis involves repeating the fitting of the slippage plane geometry from the geomechanical model with amplitudes of the primary and secondary sound waves that are randomly ascribed to the microseismic events. This has the effect of providing a randomized data set where it is known there is no order to the data. However, even when there is no order to the data, after the amplitudes have been shuffled, it is known that there will be some fit to the data from the geomechanical model due to noise and scatter. Thus, the fit of the geomechanical model slippage angles to the randomized data for wave amplitudes represents a statistical background fit, against which the fit to the non-shuffled data can be compared for its significance.

In this way this statistical comparison is internally generated by essentially removing the order from the data. It therefore provides a powerful way of identifying the potential of the geomechanical model to identify an actual slippage plane, and guards against merely finding best-fits to the data which do not represent real slippage planes.

In embodiment of the present disclosure it may be assumed that microseismic events are mostly double-couple events and slip may be represented on failure planes that are geomechanically favorable to slipping. In aspects of the present disclosure, minimum pre-requisite information for the method may comprises the vertical stress, the minimum horizontal stress and the reservoir pore pressure—information that is also the minimum pre-requisite for hydraulic fracture modeling and so there is no requirement to obtain information other than that needed for standard fracture design.

In one embodiment, the basic operation of the method can be described via the following steps:

1. Set up a simple geomechanical model based on the total vertical stress, the minimum horizontal stress and the reservoir pore pressure;
2. Complete the geomechanical model by selecting (at random) a magnitude and orientation for the other horizontal stress;
3. For each microseismic event location:
   a. Select an orientation (dip and strike) at random for the event plane;
   b. Use the geomechanical model to determine the shear and normal stress on the chosen plane orientation;
   c. Determine the rake angle along which the plane would slip and the ratio of shear stress to effective normal stress (the minimum friction coefficient the plane must have if it were to slip); and
   d. Repeat steps 3a-c of the order of about 100 times and retain only the orientation with the highest friction coefficient—this represents the most likely plane to fail of the orientations tried.
4. Forward model the P/Sh (and Sh/Sv) amplitude ratio for the orientations recovered in step 3.
5. Compare the fit between the model and the observed data to the fits obtained between the model and sets of the observed data where the amplitude ratios have been randomly resampled (to destroy the plane orientation information—see 'handling limited angle, noisy data').

The geomechanical models that produce modeled amplitude ratios provided a match to the observed data that is improbably good compared to a match to observations that do not contain orientation information (i.e. randomly re-sampled amplitude-ratios), may then be used to generate sets of plane orientations that are consistent with the observed microseismicity.

These geomechanical models can then be used to generate plane sets, for a given estimate of the maximum horizontal stress, that are suitable for use with a fracture model simulator or the like as well as providing an estimate of the horizontal stress orientation. Furthermore, in aspects, the effective stress (pore pressure) corresponding to the failure may be recovered and so it is possible to distinguish between microseisimicity occurring close to tensile conditions (zero effective stress, in the vicinity of a propagating hydraulic fracture) from those corresponding closer to the initial stress conditions (indicating that the initial stress state is very close to failure, as might well be the case on a natural fracture). This is useful in that it can help analyze where microseismicity is fluid related (low effective stress), differentiating that from movement on a pre-existing fault plane that absorbs strain energy without being accessed hydraulically (higher effective stress). The information can also be compared to cluster-based b-values to determine whether there is an empirical relationship between high b-values and low effective stress conditions.

A Simple Geomechanical Model

The total vertical stress can be estimated as the integral of rock bulk density:

$$\sigma_v = \int_0^z \rho_b(z) dz$$

In the absence of observations, in some aspects a mean rock density of around 2.3 g/cc may be assumed to obtain an approximate total vertical stress at any given depth.

The minimum horizontal stress is the fracturing pressure of the formation and this will have been estimated for the stimulation treatment design, and post-treatment analysis. The reservoir pressure can be estimated as equal to the hydrostatic head for a given depth, although again an estimate will generally be available since it is used in the stimulation treatment design.

In aspects of the present disclosure, effective shear stress may be plotted on the x-axis and the normal stress on the y-axis to build up a set of locations within a three-dimensional Mohr diagram. The possible rake angle in this situation is constrained by the shear stress orientation. The chance of failure is higher for orientations which have a larger shear stress compared to the normal effective stress. So by considering of the order of 100 orientations of dip and strike at random, the orientation giving the highest ratio of shear stress to normal effective stress may be determined as being the most likely to slip and give rise to microseismicity.

BRIEF DESCRIPTION OF THE DRAWINGS

The invention will now be illustrated by the following example and with reference to the following figure, in which.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
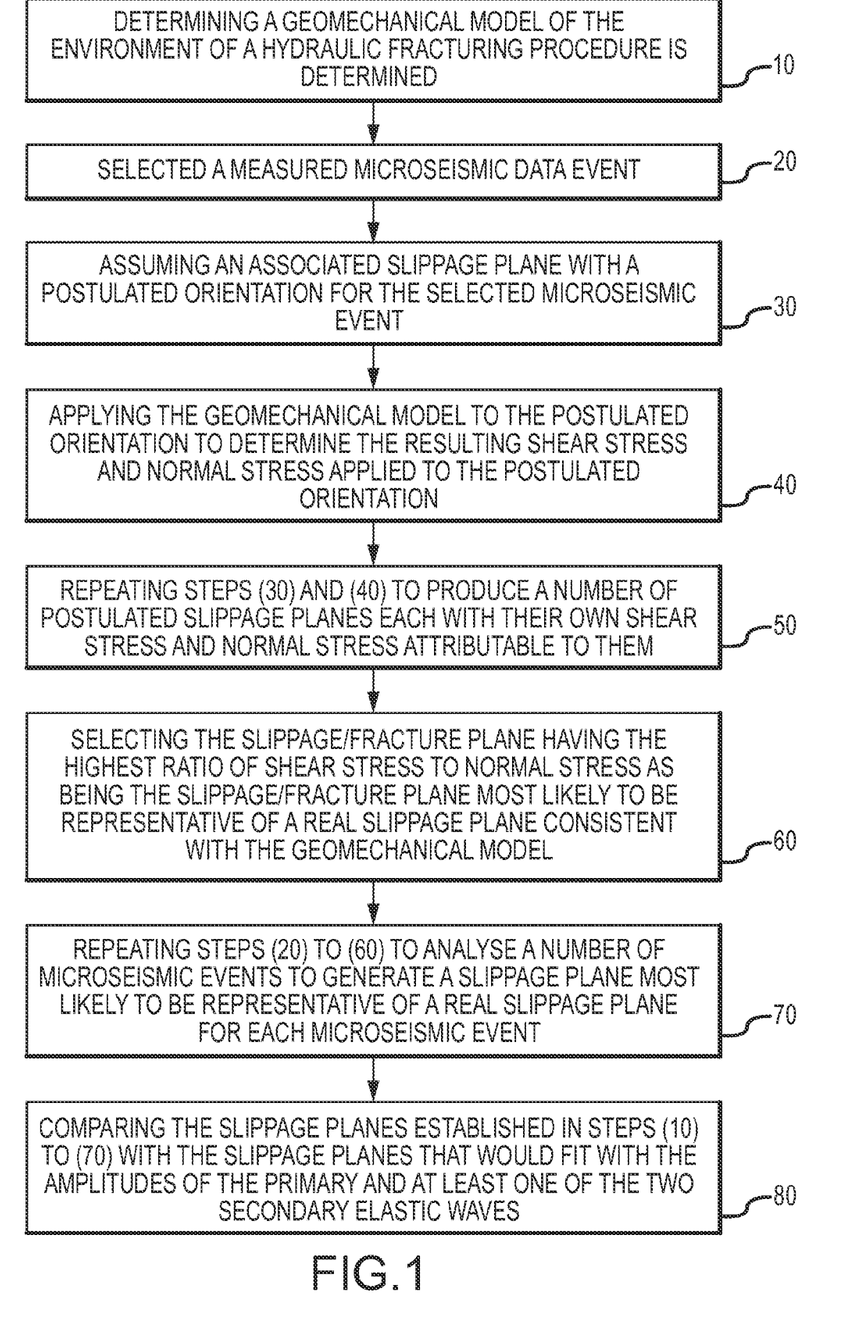
FIG. 1 is flow-type illustration of a method for microseismic data analysis, in accordance with an embodiment of the present invention.

For purposes of clarity, a method for analyzing measured microseismic events obtained from monitoring induced hydraulic fracturing of underground geological formations in accordance with the present disclosure is provided where the steps are given identifiers as follows:

(10) postulating a geomechanical model for the region bounding the microseismic events, the model including the parameters vertical stress, reservoir pore pressure, minimum horizontal stress and the orthogonal horizontal stress;

(20) selecting a microseismic event;

(30) for the selected microseismic event, assuming an associated slippage plane with a postulated orientation;

(40) applying the geomechanical model to the postulated orientation to determine the resulting shear stress and normal stress applied to the postulated orientation;

(50) repeating steps (30) and (40) to produce a number of postulated slippage planes each with their own shear stress and normal stress attributable to them;

(60) selecting the fracture plane having the highest ratio of shear stress to normal stress as being the fracture plane most likely to be representative of a real slippage plane consistent with the geomechanical model;

(70) repeating steps (20) to (60) to analyze a number of microseismic events to generate a slippage plane most likely to be representative of a real slippage plane for each microseismic event; and (80) comparing the slippage planes established in steps (10) to (70) with the slippage planes that would fit with the amplitudes of the primary and two secondary elastic waves.

In an embodiment of the present disclosure, in step 10, a geomechanical model of the environment of the HFM procedure is determined. The environment may comprise the earth formation in which a borehole extends and from which a hydraulic fracturing process is to be performed or is being performed. In aspects of the present disclosure, parameters required to generate the geomechanical model are either known and/or may be estimated within upper and lower bounds. For example, the vertical stress is known because it may be derived from the integral of the formation density over the depth of drilling to the HFM site. Likewise the reservoir pore pressure may be measured or determined at least within upper and lower bounds, which bounds may be determined from drilling the borehole in which the hydraulic fracturing is to be performed.

When the horizontal stress is split up into two orthogonal horizontal stresses, the minimum horizontal stress is also known from the HFM procedure. Thus, in general, the only unknown parameter is the remaining horizontal stress. The present invention has been found to work with real HFM data even when the geomechanical model contains only approximate estimates of unknown parameters and when the geomechanical model is simple.

In step 20, a microseismic event is selected from a microseismic data set associated with the hydraulic fracturing. The data set may comprise real-time data from seismically monitoring the hydraulic fracturing procedure. In some aspects the microseismic event may be randomly selected.

In step (30), the postulated fracture plane may have a randomly assigned orientation. However, often the range of possible orientations is bounded by externally derived information. In this case the assigned orientations may be randomly assigned within the available bounds.

In step (40), the stress tensor is known from the geomechanical model. As such, in aspects of the present disclosure, by applying the stress tensor to the plane of postulated slippage, the shear stress and normal stress applied to that plane may be determined.

In step (50), steps (30) and (40) are repeated. The repeating of these steps may start from a new randomly selected postulated fracture plane. Thus, repeating (30) and (40) produce a number of postulated slippage planes each with their own shear stress and normal stress attributable to them. The number of repeats depends on the available computational resources. In aspects of the present disclosure, of the order of 100 repeats or more has proved to be sufficiently rigorous.

In step (60) the next microseismic event is selected and the process repeated again to analyze that microseismic event. The next microseismic event may be chosen randomly or systematically. In some aspects of the present invention, all or nearly all of the microseismic events will be selected in this step.

It has been found that steps (10) to (60) can be performed many times with different geomechanical models, or values for parameters in the geomechanical model. The repetition with different models or parameters produces a variety of results. In one embodiment, the best performing geomechanical model, the one with the best fit to the data or the like can be chosen as the most likely representative of the actual geomechanical situation. Thus, parameters in the geomechanical model can be varied or evolved in a random or systematic manner, until a geomechanical model which produces the most statistically significant postulated slippage planes is arrived at.

In a further aspect of the present invention, the postulated fracture planes with high significance can be employed as geometrical constraints within a complex hydraulic fracture simulation software program. Such facture simulation software models the evolution of a hydraulic fracture based on knowledge of the material properties of the geology as well as the actual pump rate of fluid into the fracture. Such software is often termed 'complex fracture simulation' in the art and a good example is Mangrove Unconventional Fracture Model ("UFM") by Schlumberger. While fracture simulation software may comprise a very powerful method for fracture simulation, because of the scatter in the measured data, as discussed in the introduction, it cannot be used alone to fit to the measured data. Thus, a method in accordance with an embodiment of the present invention may include a step (i) wherein the most likely location and orientation of slippage planes found from steps (a) to (h) are input into a complex fracture simulator, and a complex fracture simulation is performed.

The complex fracture simulator utilizes material balances and pressures encountered. Therefore one output of the complex fracture model is a better, more refined understanding of the geomechanical environment. Thus, in some embodiments, once the complex fracture mechanics simulation has been carried out steps (10) onwards can be performed again with a more detailed geomechanical model.

Thus, in an embodiment of the present disclosure, starting from a simple geomechanical model, it is possible to derive an interpretation which is internally generated, is fully consistent with realistic geomechanics and is consistent with material balances.

EXAMPLE

In an example of using a method in accordance with an embodiment of the present disclosure, a synthetic set of P/Sh amplitude ratios was generated for a stress regime where:
vertical stress is based on integrating a bulk rock density of 2.3 g/cc;
pore pressure is hydrostatic pressure; and
minimum effective horizontal stress is related to effective vertical stress via:

$$\sigma'_h = \frac{\nu}{1-\nu}\sigma'_v$$

where $\nu$ is Poisson's ratio and a value of 0.3 was assumed.

The following unknowns are defined as follows, and are treated as parameters to be estimated:
1. The intermediate stress $\sigma_H = \alpha\sigma_v + (1-\alpha)\sigma_h$—where $\alpha$ is treated as the unknown ($0<\alpha<1$);
2. The pressure at failure $P_f = \beta\sigma_h + (1-\beta)P_{reservoir}$—where $\beta$ is the unknown ($0<\beta<1$); and
3. The orientation of $\sigma_H$ which can take any direction from N000E to N180E.

The description above corresponds to the stress regime where $\sigma_v > \sigma_H > \sigma_h$.

Figure 2:
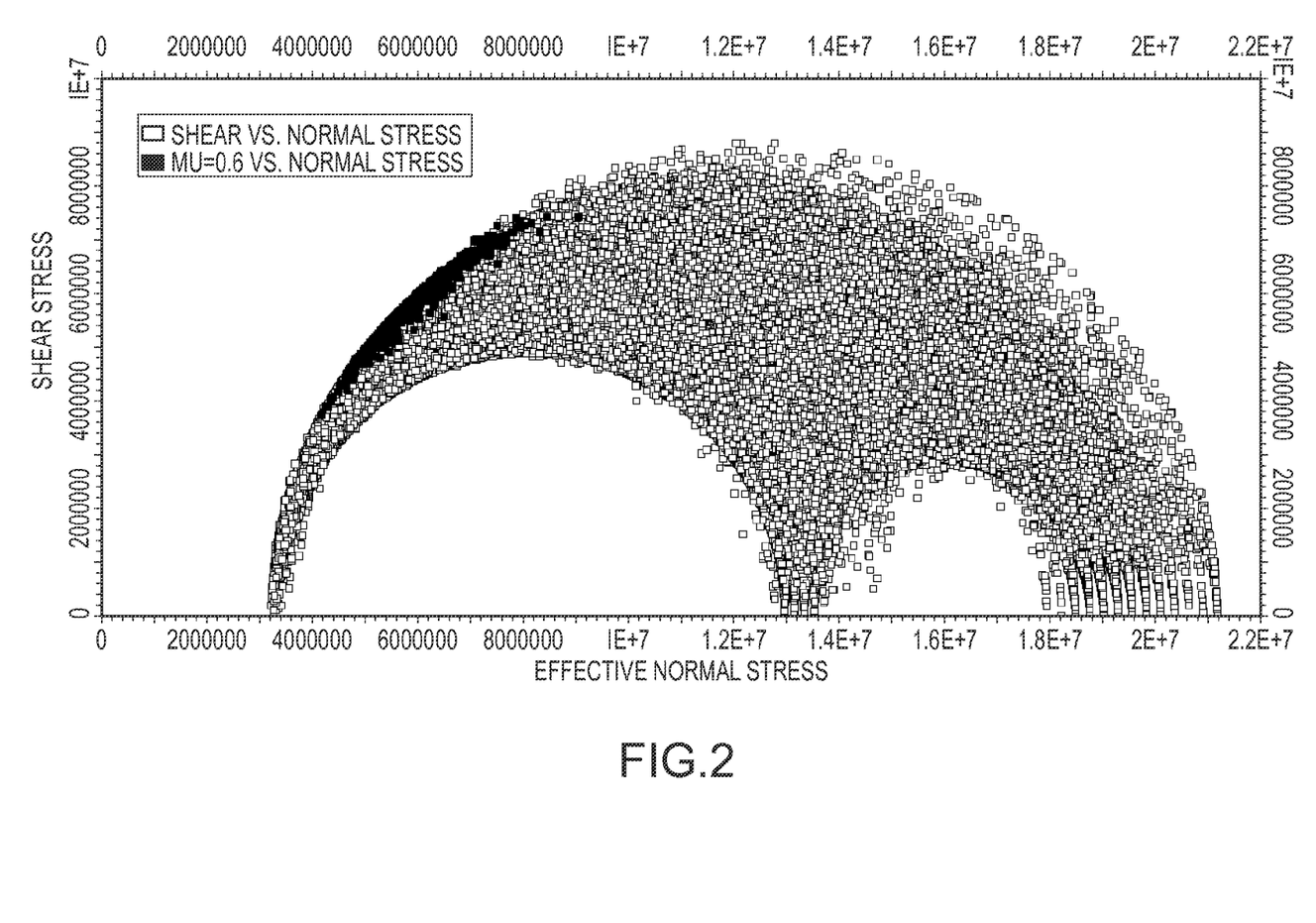
FIG. 2 is a Mohr circle, showing the calculated values of shear stress and normal stress resulting from applying a geomechanical model to the microseismic data in step (d).
Figure 3:
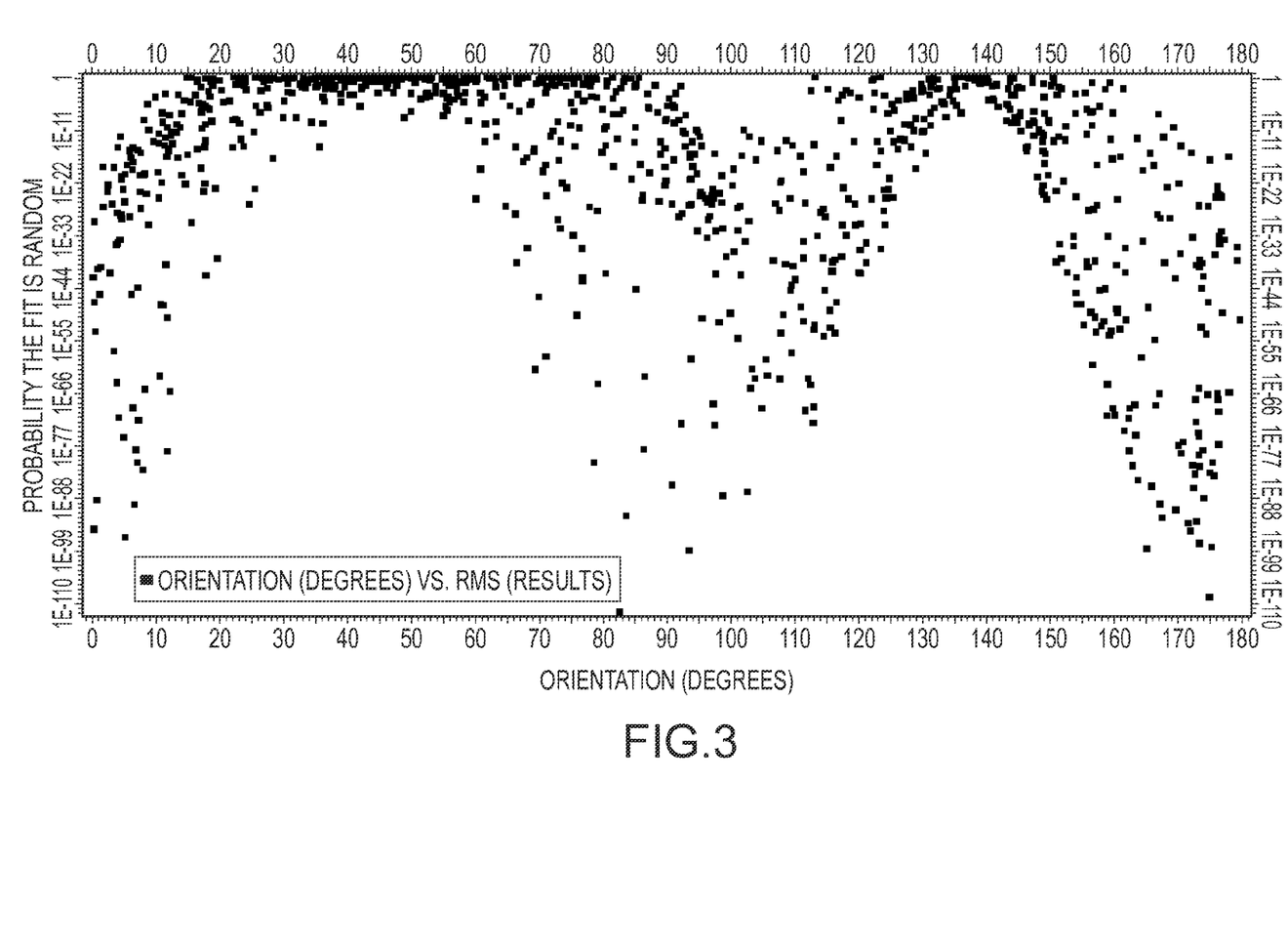
FIG. 3 is a chart of the orientation of a slippage plane against the likelihood that the fit is random, as generated in step (h).

The parameters used in generating the synthetic example were:
$\alpha = 0.54$
$\beta = 0.27$
orientation=N80.2E The best example result, recovered using the method outlined in steps (10) to (70) was
$\alpha = 0.21$
$\beta = 0.29$
orientation=N82.7E The plot of orientation versus fit (FIG. 2) shows that there is typically a 90 degree ambiguity in the horizontal stress orientation. Typically sufficient stress information is available to rule out one of the possibilities.

The parameter $\beta$ corresponding to pressure) is reasonably resolved, particularly if the true value of $\beta$ is close to zero (initial pore pressure) or one (tensile failure). This parameter is of great importance in determining whether microseismic events are near to the propagating fracture ($\beta$ close to 1) or occurring on pre-existing natural fractures some distance away ($\beta$ close to 0)

The parameter $\alpha$ (corresponding to the magnitude of the maximum horizontal stress) is not resolved by considering the P/Sh amplitude ratio. Instead, the approach is to generate example orientation-sets corresponding to different values of β and then forward model the pump-schedule in UFM to determine which value of $\sigma_H$ results in a match to observed net pressure. In this way the complex fracture simulator is employed together with the present invention in a complementary way.

The resulting geomechanical model immediately provides input suitable for the complex fracture software known as UFM. The UFM software requires the stress orientation as an input. It also requires an idea of inclusions that may be intersected by the fracturing process—these are generated directly as realizations of the microseismic events in step (e) and can be written out as a discrete fracture network which is compatible with the UFM's inputs.

This process is very well suited to deriving the inputs required by the UFM simulator, in addition to recovering stress state (stress orientation and pore pressure) information that can be used in history matching a more detailed finite-element geomechanical model, for example using the Schlumberger software VISAGE.

The multiple realizations of microseismic orientations can be carried forward through UFM's proppant placement calculation—which is then used as a base for reservoir flow simulations, for example using the Schlumberger software ECLIPSE for simulations of production.

While the principles of the disclosure have been described above in connection with specific apparatuses and methods, it is to be clearly understood that this description is made only by way of example and not as limitation on the scope of the invention. Moreover, while different embodiments and aspects have been described the different embodiments and/or aspects may be combined and/or elements of different embodiments/aspects may be combined.

What is claimed is:

1. A method of analyzing measured microseismic events, the method comprising:

measuring primary and secondary sound waves from the microseismic events obtained from monitoring induced hydraulic fracturing of a subterranean geological formation; and determining one or more most likely slippage planes associated with the microseismic events using the measured primary and secondary sound waves, comprising:

(a) postulating a geomechanical model for a subterranean region within the subterranean geological formation bounding locations where the microseismic events occurred, the model including at least one of the parameters of vertical stress, reservoir pore pressure, minimum horizontal stress or orthogonal horizontal stress;

(b) selecting a location where one of the microseismic events occurred;

(c) for the selected location, assuming an associated slippage plane with a postulated orientation;

(d) applying the geomechanical model to the postulated orientation to determine the resulting shear stress and normal stress to the postulated orientation;

(e) repeating steps (c) and (d) to produce a probability distribution of possible combinations of shear stress and normal stress attributable to a number of assumed slippage planes associated with the one of the microseismic events;

(f) comparing the assumed slippage planes of the microseismic event location established in steps (a) to (e) with the slippage planes that are consistent with one of a combination with and an alternative to: amplitudes of the primary and secondary sound waves for the one of the microseismic events to obtain a fit;

(g) comparing the fit obtained in step (f) to a statistical baseline where plane orientation information in the measured primary and secondary sound waves for the microseismic events is destroyed, wherein the statistical baseline is generated by repeating step (f) wherein the one of the combination with or the alternative to the amplitudes of the measured primary and secondary sound waves for the microseismic events are shuffled randomly and is a distribution of random fit probability for the number of assumed slippage planes associated with the microseismic events; and (h) selecting one or more most likely slippage planes associated with the microseismic events from the number of assumed slippage planes using the probability distribution of possible combinations of shear stress and normal stress, wherein the most likely slippage planes have the highest ratios of shear stress to normal stress, and wherein the probability that each of the one or more most likely slippage planes is representative of a real slippage plane is found using the distribution of random fit probability.

2. The method according to claim 1, wherein the geomechanical model employs an arbitrarily assigned value to at least one of the parameters in the model.

3. The method according to claim 1, wherein in step (c), the postulated slippage plane has a randomly assigned orientation within bounds.

4. The method according to claim 1, wherein in step (e), the repeated steps start from a new randomly selected postulated slippage plane.

5. The method according to claim 1, wherein in step (e), steps (c) to (d) are repeated at least 100 times.

6. The method according to claim 1, wherein steps (a) to (f) are performed many times wherein the geomechanical model employs an arbitrarily assigned value and the arbitrarily assigned value is different than in previous geomechanical models.

7. The method according to claim 6, wherein steps (a) to (f) are performed many times and the parameters in the geomechanical model varied or evolved until a geomechanical model which produces the most likely plane slippage location and orientation consistent with the data is achieved.

8. The method according to claim 1, which includes a step (i) wherein the most likely location and orientation of slippage planes found from steps (a) to (h) are input into a complex fracture simulator.

9. The method according to claim 1, wherein in step (f), the one of the combination with and the alternative to amplitudes of the primary and secondary sound waves for each microseismic event comprises a polarity of the primary and secondary sound waves.

10. The method according to claim 1, which includes a step (j) for repeating steps (b) to (h) to analyze a number of microseismic events to generate the most likely slippage plane for each microseismic event.

11. The method according to claim 10, wherein in step (j), steps (b) to (h) are carried out for all or nearly all of the microseismic events.

12. A method of monitoring hydraulic fracturing of a subterranean formation, the method comprising:

using a plurality of receivers to detect primary and secondary sound waves from microseismic events produced by the hydraulic fracturing of the subterranean formation; and using the detected primary and secondary sound waves with non-transient instructions on a processor to:

(a) process a geomechanical model for a region of the subterranean formation bounding locations where the detected microseismic events occurred, wherein the geomechanical model includes at least one of a vertical stress, a reservoir pore pressure, a minimum horizontal stress or an orthogonal horizontal stress;

(b) for one of the detected microseismic event locations, postulate an associated slippage plane and an orientation of the associated slippage plane;

(c) apply the geomechanical model to the orientation to determine a resulting shear stress and normal stress applied to the orientation;

(d) repeat steps (b) and (c) for different postulations of associated slippage planes to produce a probability distribution of possible combinations of shear stress and normal stress attributable to a set of slippage planes associated with the one of the detected microseismic event locations;

(e) using the processor to compare the set of slippage planes of the microseismic event location established in steps (a) to (d) with slippage planes that are consistent with one of a combination with and an alternative to: amplitudes of primary and secondary sound waves associated with the one of the detected microseismic events to obtain a fit;

(f) comparing the fit obtained in step (e) to a statistical baseline where the plane orientation information in the detected microseismic events is destroyed, wherein the statistical baseline is generated by repeating step (e) using randomly shuffled the one of the combination with and an alternative to: amplitudes of the primary and/or secondary sound waves and is a distribution of random fit probability for the set of slippage planes associated with the one of the microseismic event locations; and (g) selecting one or more geomechanical-model-consistent slippage planes associated with the detected microseismic events from the set of slippage planes, wherein the one or more geomechanical-model-consistent slippage planes have highest ratios of shear stress to normal stress, and wherein the probability that each of the one or more geomechanical-model-consistent slippage planes is representative of a real slippage plane is found using the distribution of random fit probability.

13. The method according to claim 12, wherein steps (a) to (e) are performed many times using different geomechanical models, wherein each of the different geomechanical models comprises an arbitrarily assigned value for a parameter in the geomechanical model and the arbitrarily assigned value is different for each of the geomechanical models.

14. The method according to claim 13, wherein steps (a) to (e) are performed many times and the parameters in the geomechanical models are varied or evolved until a consistent geomechanical model that produces the most likely plane slippage location and orientation consistent with the microseismic data is determined.

15. The method according to claim 12 wherein the geomechanical-model-consistent slippage planes are used to process an image or description of a fracture produced by the hydraulic fracturing.

16. The method according to claim 15, wherein the image or description of the fracture is used to control the hydraulic fracturing.

17. The method according to claim 15, wherein the image or description of the fracture is applied to a reservoir model.

18. The method according to claim 12, wherein in step (e), the one of the combination with and the alternative to amplitudes of the primary and secondary sound waves for each microseismic event comprises a polarity of the primary and secondary sound waves.

19. The method according to claim 12, which includes a step (h) for repeating steps (b) to (g) to analyze a number of microseismic events and generating the geomechanical model consistent slippage plane for each microseismic event.

* * * * *